United States Patent
Lin et al.

(10) Patent No.: US 7,078,293 B2
(45) Date of Patent: Jul. 18, 2006

(54) METHOD FOR FABRICATING OPTICAL INTERFERENCE DISPLAY CELL

(75) Inventors: Wen-Jian Lin, Hsinchu (TW); Hsiung-Kuang Tsai, Taipei (TW)

(73) Assignee: Prime View International Co., Ltd., Hsinchu (TW)

( * ) Notice: Subject to any disclaimer, the term of this patent is extended or adjusted under 35 U.S.C. 154(b) by 221 days.

(21) Appl. No.: 10/796,997

(22) Filed: Mar. 11, 2004

(65) Prior Publication Data

US 2005/0003667 A1    Jan. 6, 2005

(30) Foreign Application Priority Data

May 26, 2003    (TW)  ................ 92114188 A

(51) Int. Cl.
*H01L 21/302*   (2006.01)
(52) U.S. Cl. .................. 438/253; 438/396; 438/30; 438/157; 438/99; 216/2; 216/5; 216/13; 216/17; 216/23; 216/24; 216/67; 359/245; 359/246; 359/254; 359/290; 359/291
(58) Field of Classification Search ............ 216/24
See application file for complete search history.

(56) References Cited

U.S. PATENT DOCUMENTS

| 5,835,255 A | 11/1998 | Miles ............. 359/291 |
| 6,870,654 B1 * | 3/2005 | Lin et al. .......... 359/245 |

FOREIGN PATENT DOCUMENTS

JP    2004102022 A  *  4/2004

* cited by examiner

*Primary Examiner*—Nadine G. Norton
*Assistant Examiner*—Patricia George
(74) *Attorney, Agent, or Firm*—Baker & Hostetler LLP

(57) ABSTRACT

A method for fabricating an optical interference display cell is described. A first electrode and a sacrificial layer are sequentially formed on a transparent substrate and at least two openings are formed in the first electrode and the sacrificial layer to define a position of the optical interference display cell. An insulated heat-resistant inorganic supporter is formed in each of the openings. A second electrode is formed on the sacrificial layer and the supporters. Finally, a remote plasma etching process is used for removing the sacrificial layer.

28 Claims, 2 Drawing Sheets

METHOD FOR FABRICATING OPTICAL INTERFERENCE DISPLAY CELL

FIELD OF INVENTION

The present invention relates to a method for manufacturing a structure of a structure release, and more particularly, the present invention relates to a structure of a structure release and a method for manufacturing the same adapted for an optical interference display cell.

BACKGROUND OF THE INVENTION

In a micro electro mechanical system (MEMS), the development of a sacrificial layer technique has become a key factor for manufacturing a suspended structure, such as a cantilever, a beam, a membrane, a channel, a cavity, a joint or hinge, a link, a crank, a gear or a rack, to name a few. A structure release etching process is adapted for removing a sacrificial layer, so a structure of a structure release in a micro electro mechanical system has a critical influence on the process of removing the sacrificial layer.

A conventional structure release etching process is first introduced with an interference display cell as an example. The interference display cell, a kind of a micro electro mechanical system, is used to fabricate a planar display. Planar displays have great superiority in the portable display device and limited-space display market because they are lightweight and small. To date, in addition to liquid crystal displays (LCD), organic electro-luminescent displays (OLED), and plasma display panels (PDP), a mode of optical interference display is another option for planar displays.

FIG. 1A and FIG. 1B illustrate a method for manufacturing a conventional optical interference display cell. Referring to FIG. 1A, a first electrode 110 and a sacrificial layer 111 are formed in sequence on a transparent substrate 109, and openings 112, each suitable for forming a supporter therein, are formed in the first electrode 110 and the sacrificial layer 111. Then, a supporter 106 is formed in each of the openings 112. Next, an electrode 114 is formed on the sacrificial layer 111 and the supporter 106. Subsequently, referring to FIG. 1B, the sacrificial layer 111 shown in FIG. 1A is removed by a release etching process to form a cavity 116, which is located in the position of the sacrificial layer 111, and the length D of the cavity 116 is the thickness of the sacrificial layer 111.

In a micro electro mechanical process, a micro suspended structure is fabricated by the use of a sacrificial layer. A suspended movable microstructure is fabricated by a selective etching between a device structure layer and the sacrificial layer to remove the sacrificial layer and leave the structure layer, and this process is called a structure release etching. The difference between the structure release etching process and an IC process is that in the structure release etching process, the selective etching is an isotropic etching, so that an undercut or an under etching is formed in the structure layer for smooth separation of the structure layer and the substrate.

The most popular structure release etching process is a wet structure release process. In the wet structure release process, a rinsing step and a drying step usually have to be performed after etching, and a microstructure can substantially be suspended above the substrate. However, during the wet structure release process, it is quite easy for the structure and the substrate to stick together, thereby resulting in failure of the device. A dry etching process using xenon difluoride ($XeF_2$) as an etchant can be used to solve the problems due to the wet etching process.

Xenon difluoride is in a solid state at normal temperature and normal pressure, and is sublimated into the gaseous state at low pressure. Xenon difluoride has a high etching rate for silicon materials such as monocrystalline silicon, polysilicon and amorphous silicon, and some metals such as molybdenum (Mo), molybdenum alloy and so on. Xenon is an inert gas, and xenon difluoride is quite unstable. The etching mechanism of xenon difluoride is that two fluorine free radicals are brought to the reaction positions by xenon, and when xenon difluoride contacts the material to be etched, xenon difluoride decomposes to release these two fluorine free radicals. Because the isotropic etching effect of xenon difluoride is great, xenon difluoride has an excellent capacity for lateral etching. In a micro electro mechanical system process, xenon difluoride is used as an etchant to remove a sacrificial layer in a structure release etching process. Typically, since the activity of xenon difluoride is quite high, i.e., the activation energy of the decomposition of xenon difluoride into fluorine free radicals is quite low, and a reaction occurs almost immediately as soon as xenon difluoride contacts the material to be etched even at room temperature. Therefore, raising the etching temperature can hardly increase the etching rate of xenon difluoride. A xenon difluoride etching process is typically conducted at a temperature lower than 70° C.

FIG. 2 illustrates a top view of a conventional optical interference display cell 200. The optical interference display cell 200 includes separation structures 202, as indicated by dotted lines 2021, located on two opposite sides of the optical interference display cell 200, and supporters 204 located on the other two opposite sides of the optical interference display cell 200. The separation structures 202 and the supporters 204 are located between two electrodes. There are gaps between the supporters 204, as well as between the supporters 204 and the separation structures 202. The gaseous xenon difluoride permeates through the gaps and etches a sacrificial layer (not shown in FIG. 2). The etching rate of a structure release etching process using an etchant of the gaseous xenon difluoride depends on the material of the sacrificial layer desired to be etched. Typically, the etching rate exceeds 10 micrometers per minute, and can be up to 20–30 micrometers per minute for some materials. So far as the size of the present optical interference display cell is concerned, one structure release etching process only takes dozens of seconds to 3 minutes.

Although the structure release etching process performed with the etchant of gaseous xenon difluoride has the aforementioned advantages, the structure release etching process has a drawback: the cost can't be reduced due to the character of xenon difluoride itself. Xenon difluoride is expensive, is particularly sensitive to moisture and is unstable. When xenon difluoride contacts moisture, hydrogen fluoride is produced. Hydrogen fluoride is not only dangerous, but also reduces efficiency of etching. Besides, the structure release etching process performed using xenon difluoride as an etchant is rarely found in semiconductor processes and typical planar display processes, so etchers that are well developed in current semiconductor processes and liquid crystal display processes are unsuitable for the structure release etching process using xenon difluoride etchant. Most of the main manufacturing processes of the optical interference display can continue using conventional semiconductor or planar display processing equipment, but the structure release etching process needs a totally different apparatus design. To reorganize and consolidate the processing equipments would be an obstacle to the development and mass production of the optical interference display.

SUMMARY OF THE INVENTION

The development of the etching equipment using xenon difluoride etchant is not maturing, which is disadvantageous to the development and mass production of the optical interference display, and the etchant xenon difluoride is expensive and unstable. Therefore, if etching equipment used in semiconductor or typical planar display manufacture can be applied to perform a structure release etching process, the processing equipment of the optical interference display can be easily reorganized and consolidated, and the structure release etching process can be performed at a lower cost.

The reason that the etching equipment used in typical semiconductor or planar display manufacture is not suitable for use in the structure release etching process is the poor capacity thereof for lateral etching, and even if an etchant with a great etching property, for example, an etchant having a fluorine group or a chlorine group such as nitrogen trifluoride ($NF_3$) or sulphur hexafluoride ($SF_6$), is used, the etching rate is only between 3 micrometers and 10 micrometers per minute. This is slower than that for using xenon difluoride as an etchant by several to dozens of times. Therefore, this is very disadvantageous to the throughput of the optical interference display.

Remote plasma is conducted by first producing plasma in a plasma generator, filtering out a portion or all of the charged composition in the plasma, and then introducing the remaining plasma, the remote plasma, into a chamber to perform a reaction. Diffusion of the active composition is the main control mechanism for the lateral etching. Free radicals are the main composition of the remote plasma, so a life cycle of the remote plasma is longer and the structure release etching of the sacrificial layer is performed efficiently. Additionally, the free radicals are not charged and not easily affected by an electric field, so the effect of isotropic etching is better for being beneficial to lateral etching.

Furthermore, one way to increase the etching rate and reduce the etching time is to raise the temperature of the remote plasma etching process, since raising the temperature increases the energy of the free radicals in the remote plasma, decreases the activation energy of the reaction, and increases the rates of diffusion of molecules. However, in the current manufacturing process of the optical interference display cell, the supporters are formed from organic polymers such as polyurethane, epoxy resin and so on, and the structure release etching process is conducted after the supporters have been formed. Typically, since organic materials cannot resist high temperatures, the subsequent processing temperature for a construct comprised of elements made from organic composition provided therein must be kept within certain limits, typically under 250° C. Therefore, even though raising the temperature can increase the etching rate, there is still a limit as to how high the temperature can be raised.

Accordingly, an objective of the present invention is to provide a method for fabricating an optical interference display cell, which method allows the etching rate of structure release etching process to be increased while not being limited by the temperature.

Another objective of the present invention is to provide an optical interference display cell structure and a method for fabricating the cell structure wherein the lateral etching rate of an etchant having a fluorine group or a chlorine group can be increased.

Still another objective of the present invention is to provide a structure release etching process for an optical interference display cell structure, which process can be performed by the use of an etchant having a fluorine group or a chlorine group instead of xenon difluoride, thereby reducing the manufacturing cost and avoiding the difficulties resulting from reorganizing and consolidating the processing equipments.

Yet another objective of the present invention is to provide a structure release etching process for an optical interference display cell structure, which process can be performed by conventional etching equipment, thereby avoiding the difficulties resulting from reorganizing and consolidating the processing equipments.

According to the aforementioned objectives of the present invention, one preferred embodiment of the present invention provides an optical interference display cell structure including first and second electrodes supported by supporters located therebetween. The supporters are made of heat-resistant inorganic material such as spin-on-glass, phosphosilicate glass (PSG), and borophosphosilicate glass (BPSG). Alternatively, the supporters may be made of typical dielectric material such as silicon oxide, silicon nitride, silicon oxynitride, metal oxide and so on. But most important of all, the supporters must be made of heat-resistant insulating inorganic materials.

In addition, the second electrode may be provided with a plurality of holes passing through the second electrode and exposing a sacrificial layer under the second electrode, thereby accelerating the structure release etching process. Therefore, conventional remote plasma etching processes suitable for semiconductor or typical planar display manufacture, which use an etchant having a fluorine group or a chlorine group such as $CF_4$, $BCl_3$, $NF_3$, $SF_6$, or any mixture thereof, can be used to perform a structure release etching process of the optical interference display cell. When the supporters are made of heat-resistant insulating inorganic materials, the process temperature of the remote plasma etching process need not be kept under 250° C., i.e., the remote plasma etching process can be performed at a temperature higher than 250° C. or at a temperature up to 500° C., such that the process time thereof is commensurate with that of the xenon difluoride process.

In the method for manufacturing the optical interference display cell according to the present invention, the supporters are made of heat-resistant insulating inorganic material instead of conventional organic polymer, thereby making it possible for a conventional etching process to replace a xenon difluoride etching process and thereby avoiding the difficulties resulting from reorganizing and consolidating the processing equipment. The use of the remote plasma increases the life cycle of the etching plasma, the lateral etching capacity of the plasma, and the structure release etching rate, and decreases the time needed in the structure release etching, thereby increasing the throughput of the optical interference display.

BRIEF DESCRIPTION OF THE DRAWINGS

These and other features, aspects, and advantages of the present invention will be more fully understood by reading the following detailed description of the preferred embodiment, with reference made to the accompanying drawings as follows.

DETAILED DESCRIPTION OF THE PREFERRED EMBODIMENT

In order to make the illustration of a method for manufacturing an optical interference display cell in the present invention more clear, an embodiment of the present invention herein takes an optical interference display cell structure as an example to explain advantages of the present invention.

Figure 1A:
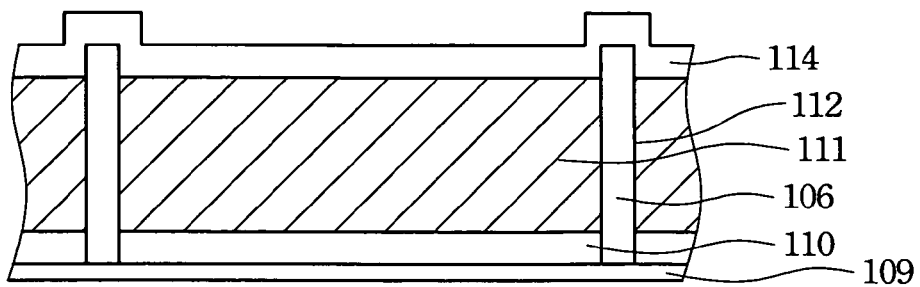
FIG. 1A and FIG. 1B illustrate a method for manufacturing a conventional optical interference display cell.
Figure 1B:
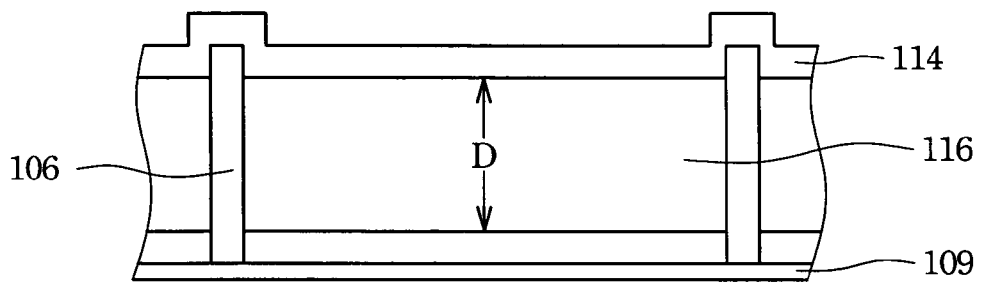
Figure 2:
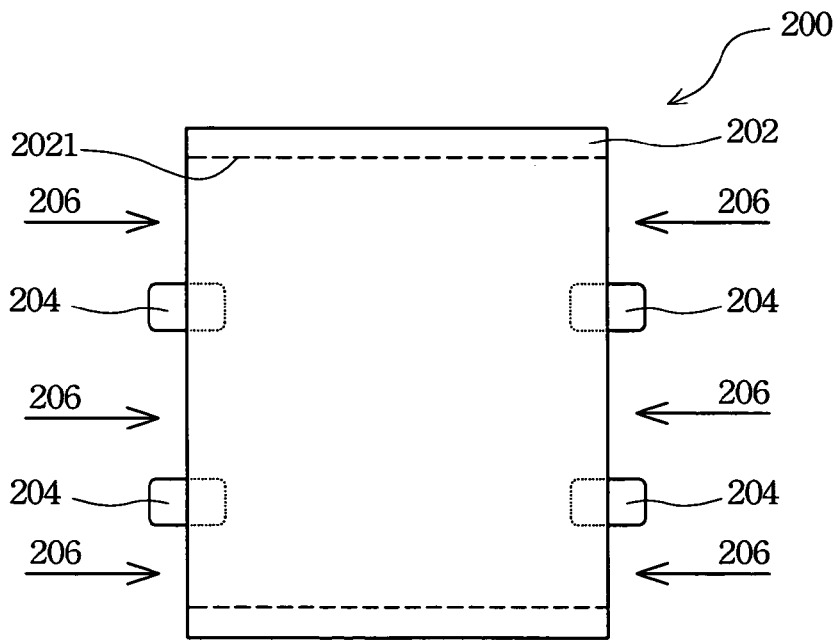
FIG. 2 illustrates a top view of a conventional optical interference display cell.
Figure 3A:
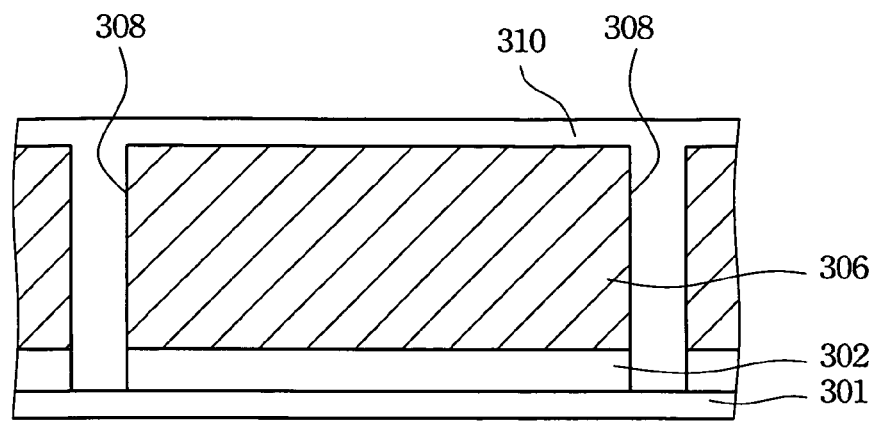
FIG. 3A to FIG. 3C illustrate a method for manufacturing an optical interference display cell structure in accordance with a preferred embodiment of the present invention.
Figure 3B:
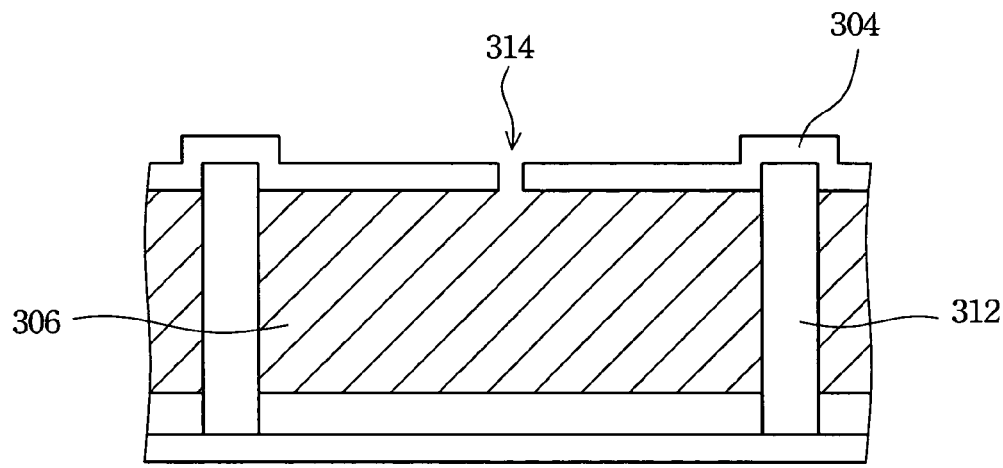
Figure 3C:
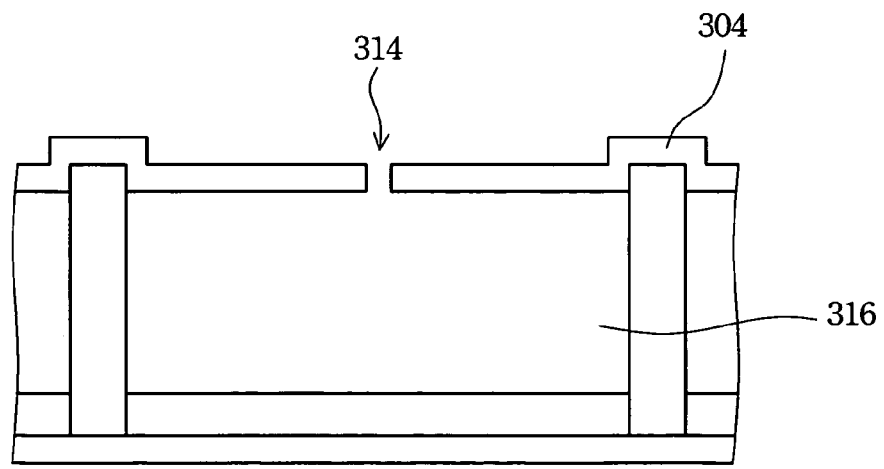

FIG. 3A to FIG. 3C illustrate a method for manufacturing an optical interference display cell structure in accordance with a preferred embodiment of the present invention. Referring to FIG. 3A, a first electrode 302 and a sacrificial layer 306 are formed on a transparent substrate 301 in sequence. The sacrificial layer 306 may be made of transparent material such as dielectric material, or opaque material such as metal material, polysilicon or amorphous silicon. In this embodiment, polysilicon is used as the material of the sacrificial layer 306. Openings 308 are formed in the first electrode 402 and the sacrificial layer 306 by a photolithography and etching process, and each of the openings 308 is suitable for forming a supporter therein.

Then, a material layer 310 is formed on the sacrificial layer 306 and fills up the openings 308. The material layer 310 is suitable for forming the supporter, and the material layer 310 is made of heat-resistant insulating inorganic material (e.g., silicate such as spin-on-glass, phosphosilicate glass (PSG), and borophosphosilicate glass (BPSG)) by a spin-coating process. Alternatively, the material layer 310 may be made of typical dielectric material (e.g., silicon oxide, silicon nitride, silicon oxynitride, metal oxide, etc.) by a chemical vapor deposition (CVD) process.

Referring to FIG. 3B, supporters 312 are defined by patterning the material layer 310 through a photolithographic etching process. Next, a second electrode 304 is formed on the sacrificial layer 306 and the supporters 312. The second electrode 304 may be provided with at least one hole 314 defined therein, thereby reducing the etching time of the subsequent structure release etching process. Alternatively, a chemical mechanical polishing process may be used to remove the portion of the material layer 310 above the sacrificial layer 306 in order to form the supporters 312.

Finally, the sacrificial layer 306 is etched by a remote plasma produced by using an etching reagent having a fluorine group or a chlorine group, such as, for example $CF_4$, $BCl_3$, $NF_3$, or $SF_6$, as a precursor. The remote plasma etches the sacrificial layer 306 through the gaps (not shown) between the supporters, and, if the hole 314 is provided in the second electrode 304, the remote plasma can penetrate through the hole 314 to etch the sacrificial layer 306 such that the sacrificial layer 306 is removed by a structure release etching process to form a cavity 316 as illustrated in FIG. 3C.

Compared with conventional techniques, since the supporters are made of heat-resistant insulating inorganic materials, the structure release etching process can be performed at a temperature higher than 250° C. or at a temperature up to 500° C. When the temperature of the etching process is raised, the activation energy of the reaction between the active composition of the remote plasma, i.e., the free radicals and the material of the sacrificial layer, is reduced, thereby increasing the etching reaction rate and shortening the time needed in the entire structure release etching process.

In addition, the time needed in the structure release etching process can be further reduced by providing at least one hole in the deformable electrode, so that etching processes suitable for semiconductor or planar display processes can be applied in the structure release etching process of the optical interference display cell structure, thereby avoiding the difficulties resulting from reorganizing and consolidating the xenon difluoride etching equipment and other deposition equipment (or etching equipment). Furthermore, fabrication cost can be reduced because the expensive xenon difluoride etching process is not needed.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structure.

What is claimed is:

1. A method for manufacturing an optical interference display cell on a substrate, the method comprising:
   forming a first electrode on the substrate;
   forming a sacrificial layer on the first electrode;
   forming at least two openings in the sacrificial layer and the first electrode to define a position of the optical interference display cell;
   forming a heat-resistant insulating inorganic supporter in each of the openings;
   forming a second electrode on the sacrificial layer and the heat-resistant insulating inorganic supporter in each opening; and
   removing the sacrificial layer by a remote plasma etching process.

2. The method for manufacturing an optical interference display cell according to claim 1, wherein the second electrode is a deformable electrode.

3. The method for manufacturing an optical interference display cell according to claim 1, wherein the second electrode further comprises at least one hole exposing the sacrificial layer thereunder.

4. The method for manufacturing an optical interference display cell according to claim 1, wherein a precursor of a remote plasma formed in the remote plasma etching process is an etching reagent having a fluorine group or a chlorine group.

5. The method for manufacturing an optical interference display cell according to claim 1, wherein a precursor of a remote plasma formed in the remote plasma etching process is selected from the group consisting of $CF_4$, $BCl_3$, $NF_3$, $SF_6$ and any combination thereof.

6. The method for manufacturing an optical interference display cell according to claim 1, wherein the sacrificial layer is made of a material selected from the group consisting of dielectric material, metal material and silicon material.

7. The method for manufacturing an optical interference display cell according to claim 1, wherein the heat-resistant insulating inorganic supporter is made of silicate or dielectric material.

8. The method for manufacturing an optical interference display cell according to claim 7, wherein the silicate is selected from the group consisting of spin-on-glass, phosphosilicate glass (PSG), borophosphosilicate glass (BPSG) and silicon oxide.

9. The method for manufacturing an optical interference display cell according to claim 7, wherein the dielectric material is selected from the group consisting of silicon oxide, silicon nitride, silicon oxynitride, and metal oxide.

10. The method for manufacturing an optical interference display cell according to claim 1, wherein the step of forming heat-resistant insulating inorganic supporter further comprises:
   forming a heat-resistant insulating inorganic material layer in the openings and on the sacrificial layer; and
   removing a portion of the heat-resistant insulating inorganic material layer above the sacrificial layer.

11. The method for manufacturing an optical interference display cell according to claim 10, wherein the heat-resistant insulating inorganic material layer is formed by a spin-coating process.

12. The method for manufacturing an optical interference display cell according to claim 10, wherein the heat-resistant insulating inorganic material layer is formed by a chemical vapor deposition (CVD) process.

13. The method for manufacturing an optical interference display cell according to claim 10, wherein the portion of the heat-resistant insulating inorganic material layer above the sacrificial layer is removed by a photolithographic etching process.

14. The method for manufacturing an optical interference display cell according to claim 10, wherein the portion of the heat-resistant insulating inorganic material layer above the sacrificial layer is removed by a chemical mechanical polishing process.

15. A method for manufacturing an optical interference display cell on a substrate, the method comprising:
   forming a first electrode on the substrate;
   forming a sacrificial layer on the first electrode;
   forming at least two openings in the sacrificial layer and the first electrode to define a position of the optical interference display cell;
   forming a heat-resistant insulating inorganic supporter in each of the openings;
   forming a second electrode on the sacrificial layer and the heat-resistant insulating inorganic supporter in each opening; and
   removing the sacrificial layer by a remote plasma etching process performed at a temperature between about 250° C. and about 500° C.

16. The method for manufacturing an optical interference display cell according to claim 15, wherein the second electrode is a deformable electrode.

17. The method for manufacturing an optical interference display cell according to claim 15, wherein the second electrode further comprises at least one hole exposing the sacrificial layer thereunder.

18. The method for manufacturing an optical interference display cell according to claim 15, wherein a precursor of a remote plasma formed in the remote plasma etching process is an etching reagent having a fluorine group or a chlorine group.

19. The method for manufacturing an optical interference display cell according to claim 15, wherein a precursor of a remote plasma formed in the remote plasma etching process is selected from the group consisting of $CF_4$, $BCl_3$, $NF_3$, $SF_6$ and any combination thereof.

20. The method for manufacturing an optical interference display cell according to claim 15, wherein the sacrificial layer is made of a material selected from the group consisting of dielectric material, metal material and silicon material.

21. The method for manufacturing an optical interference display cell according to claim 15, wherein the heat-resistant insulating inorganic supporter is made of silicate or dielectric material.

22. The method for manufacturing an optical interference display cell according to claim 21, wherein the silicate is selected from the group consisting of spin-on-glass, phosphosilicate glass (PSG), borophosphosilicate glass (BPSG) and silicon oxide.

23. The method for manufacturing an optical interference display cell according to claim 21, wherein the dielectric material is selected from the group consisting of silicon oxide, silicon nitride, silicon oxynitride, and metal oxide.

24. The method for manufacturing an optical interference display cell according to claim 15, wherein the step of forming heat-resistant insulating inorganic supporter further comprises:
   forming a heat-resistant insulating inorganic material layer in the openings and on the sacrificial layer; and
   removing a portion of the heat-resistant insulating inorganic material layer above the sacrificial layer.

25. The method for manufacturing an optical interference display cell according to claim 24, wherein the heat-resistant insulating inorganic material layer is formed by a spin-coating process.

26. The method for manufacturing an optical interference display cell according to claim 24, wherein the heat-resistant insulating inorganic material layer is formed by a chemical vapor deposition (CVD) process.

27. The method for manufacturing an optical interference display cell according to claim 24, wherein the portion of the heat-resistant insulating inorganic material layer above the sacrificial layer is removed by a photolithographic etching process.

28. The method for manufacturing an optical interference display cell according to claim 24, wherein the portion of the heat-resistant insulating inorganic material layer above the sacrificial layer is removed by a chemical mechanical polishing process.

* * * * *